Patented July 26, 1932

1,868,936

UNITED STATES PATENT OFFICE

RAINALD BRIGHTMAN, OF MANCHESTER, ENGLAND, ASSIGNOR TO IMPERIAL CHEMICAL INDUSTRIES LIMITED, OF LONDON, ENGLAND

DYEING REGENERATED CELLULOSE RAYON

No Drawing. Application filed July 27, 1929, Serial No. 381,693, and in Great Britain September 12, 1928.

By this invention regenerated cellulose rayon, such as viscose rayon is dyed in level shades with the dyestuffs obtained by diazotizing (or tetrazotizing) and combining a 4-amino- or 4:4'-diamino-diphenylamine with one or two molecular proportions respectively of an aminonaphtholsulphonic acid, or a derivative thereof, or, in the case of the tetrazo body, combining it with one molecular proportion of an aminonaphtholsulphonic acid or a derivative thereof, for instance, the phenol and benzoyl N-substituted derivatives, and one molecular proportion of another component, but when sulphonic acids of 4-aminodiphenylamine are employed we use only monosulphonic acids of aminonaphthols or derivatives thereof as coupling components in order to ensure a sufficient affinity of the formed dyestuff for regenerated cellulose rayon. These dyestuffs may be represented by the general formula

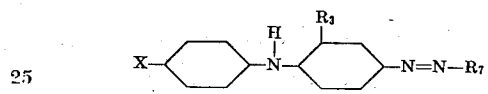

wherein $R_3$ represents hydrogen, an alkoxy or a sulphonic group, $R_7$ represents the coupled residue of an aminonaphthol sulphonic acid and X represents hydrogen or the group $-N=N-R_7'$, wherein $R_7'$ represents the coupled residue of an azo dye coupling component.

Other generic formulæ which can be used to represent the dyestuffs of my invention are as follows:

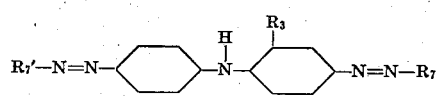

wherein $R_3$ represents hydrogen or an alkoxy or a sulphonic group, $R_7$ represents the coupled residue of an aminonaphthol sulphonic acid and $R_7'$ represents the coupled residue of an aminonaphthol sulphonic acid, a naphthol, salicylic acid or phenylenediamine;

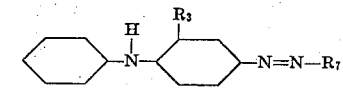

wherein $R_3$ and $R_7$ have their former significance; and

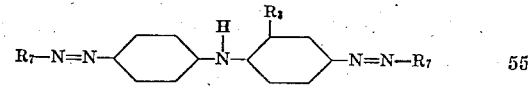

wherein $R_7$ represents an aminonaphthol sulphonic acid such as 2-amino-8-naphthol sulphonic acid, 2-phenylamino-5-naphthol sulphonic acid or 1-amino-8-naphthol sulphonic acid.

These dyes are dark powders dissolving in water to blue or violet solutions which are substantially unchanged by addition of dilute alkali and afford a precipitate on the addition of dilute acid. By the use of these dyes relatively level shades on regenerated cellulose rayon may be obtained and according to the aminonaphthol sulphonic acid employed various blue and violet shades result.

Some of these dyestuffs are already known and have been described for the dyeing of unmordanted cotton, but in view of the very uneven dyeings which the usual direct blue cotton dyestuffs give on viscose rayon, it could not have been forseen that the above dyestuffs would give such excellent results and my invention constitutes a notable advance in the art of dyeing regenerated cellulose rayon.

The following example illustrates the invention without limiting it, the parts being by weight.

*Example.*—The dyebath is made up from 3000 parts of water, 20 parts of Glauber's salt, 3 parts of soap and 1 part of the dyestuff obtained by combining 1 molecular part of tetrazotized 4:4'-diaminodiphenylamine with 2 molecular parts of 1-amino-8-naphthol-4-sulphonic acid. 100 parts of the regenerated cellulose rayon are entered into the bath warm and the bath is then raised nearly to the boiling point and the dyeing is carried on for about ¾ hour. The fabric is then removed, rinsed and dried. Alternatively the rayon may be entered into the bath nearly at the boiling point and the bath allowed to cool gradually during the dyeing. Moreover, there may also be added to the dyebath other salts or dyeing assistants such as borax or sodium carbonate. The rayon is dyed an even light blue shade.

The examples shown in the following table further illustrate the invention, the aminonaphthol sulphonic acids being coupled in all cases in alkaline solution:

The 4:4'-diamino-2-methoxydiphenylamine which is referred to may be obtained by the condensation of p-nitrochlorobenzene with p-nitro-o-anisidine and reducton of the resulting dinitro compound (melting point of latter 140–141° C.). The 4:4'-diamino-2-methoxydiphenylamine can be coupled with the azo dye components of the table and the resulting dyes give satisfactory results in dyeing regenerated cellulose.

| Dyestuff from— | Coupled with— | Shade on viscose rayon |
|---|---|---|
| 1. 4-aminodiphenylamine | 2-phenylamino-5-naphthol-7-sulphonic acid | Violet. |
| 2. ----Do---- | 1-amino-8-naphthol-2 : 4-disulphonic acid | Sky-blue. |
| 3. ----Do---- | 1-amino-8-naphthol-3 : 6-disulphonic acid | Royal blue. |
| 4. 4 : 4'-diaminodiphenylamine | 1 mol. of 1-amino-8-naphthol-2 : 4-disulphonic acid and 1 mol. of β naphthol | Reddish-blue. |
| 5. ----Do---- | 1 mol. of 1-amino-8-naphthol 3 : 6-disulphonic acid and 1 mol. of 1-naphthol-4-sulphonic acid. | Royal blue. |
| 6. ----Do---- | 2 mols. of 2-amino-8-naphthol-6-sulphonic acid | Reddish-blue. |
| 7. ----Do---- | 1 mol. of salicylic acid and 1 mol. of 2-phenylamino-5-naphthol-7-sulphonic acid | Do. |
| 8. ----Do---- | 1 mol. of salicylic acid and 1 mol. of 2-benzoylamino-8-naphthol-6-sulphonic acid. | Navy blue. |
| 9. ----Do---- | 1 mol. of 1-amino-8-naphthol 3 : 6-disulphonic acid and 1 mol. of m-phenylene diamine. | Do. |
| 10. 4 : 4'-diaminodiphenylamine-2-sulphonic acid. | 1 mol. of 1-amino-8-naphthol 3 : 6-disulphonic acid and 1 mol. of m-phenylene diamine. | Blue-black. |

What I claim and desire to secure by Letters Patent is:

1. The process of dyeing regenerated cellulose rayon material blue and relatively level shades which comprises the application to the material of a dyestuff which in the form of its free acid has the probable formula

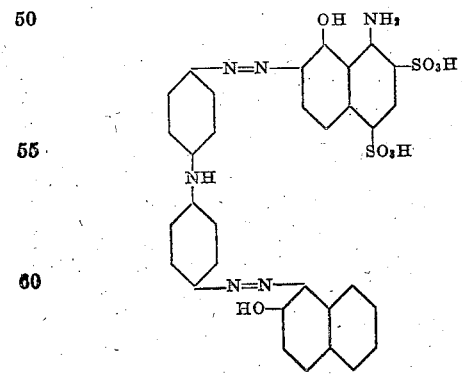

which dyestuff dissolves in water giving a blue solution which remains substantially unchanged on the addition of dilute alkali and which yields a bluish precipitate on the addition of dilute acid.

2. Regenerated cellulose rayon material dyed in relatively level blue shades by means of a dyestuff which in the form of its free acid has the probable formula

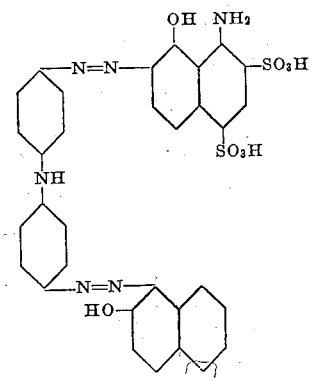

3. Regenerated cellulose rayon material dyed by means of a dyestuff having the probable formula

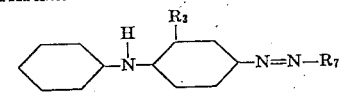

wherein $R_3$ represents hydrogen, an alkoxy or a sulphonic group and $R_7$ represents the coupled residue of an aminonaphthol sulphonic acid, the said dyed rayon material having an even level blue to violet shade.

4. Regenerated cellulose rayon material dyed by means of a dyestuff having the probable formula

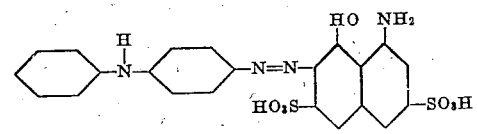

the said dyed rayon material having an even level royal-blue shade.

5. Regenerated cellulose rayon material dyed by means of a dyestuff having the probable formula

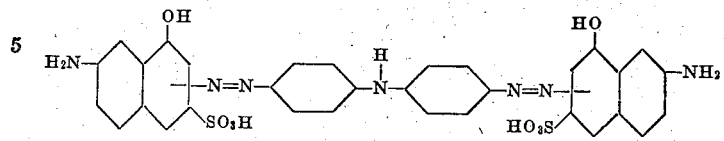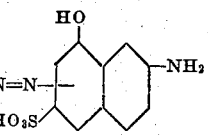

the said dyed rayon material having an even level reddish-blue shade.

6. Regenerated cellulose rayon material dyed by means of a dyestuff having the probable formula

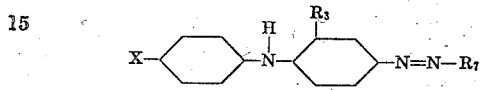

wherein $R_3$ represents hydrogen, an alkoxy or sulphonic group, $R_7$ represents the coupled residue of an aminonaphthol sulphonic acid and X represents hydrogen or the group $-N=N-R_7'$, wherein $R_7'$ represents the coupled residue of an azo dye coupling component.

7. Regenerated cellulose rayon material dyed by means of a dyestuff having the probable formula

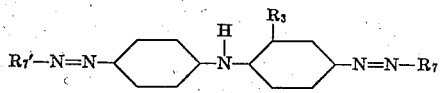

wherein $R_3$ represents hydrogen, an alkoxy or sulphonic group, $R_7$ represents an aminonaphthol sulphonic acid and $R_7'$ represents the coupled residue of an aminonaphthol sulphonic acid, a naphthol, salicylic acid or phenylenediamine.

8. Regenerated cellulose rayon material dyed by means of a dyestuff having the probable formula

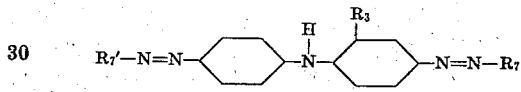

wherein $R_3$ represents hydrogen, an alkoxy or a sulphonic group, $R_7$ represents the coupled residue of a 2-amino-8-naphthol sulphonic acid, a 2-phenylamino-5-naphthol sulphonic acid or a 1-amino-8-naphthol sulphonic acid and X represents hydrogen or the group $-N=N-R_7'$, wherein $R_7'$ represents the coupled residue of an azo dye coupling component.

9. Regenerated cellulose rayon material dyed by means of a dyestuff having the probable formula

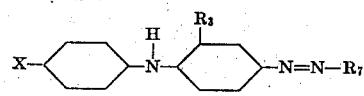

wherein $R_3$ represents hydrogen, an alkoxy or a sulphonic group and $R_7$ represents the coupled residue of a 2-amino-8-naphthol sulphonic acid, a 2-phenylamino-5-naphthol sulphonic acid or a 1-amino-8-naphthol sulphonic acid, the said dyed rayon material having an even level blue to violet shade.

10. Regenerated cellulose rayon material dyed by means of a dyestuff having the probable formula

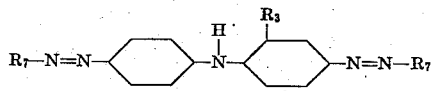

wherein $R_3$ represents hydrogen, an alkoxy or a sulphonic group, $R_7$ represents the coupled residue of a 2-amino-8-naphthol sulphonic acid, a 2-phenylamino-5-naphthol sulphonic acid or a 1-amino-8-naphthol sulphonic acid, and $R_7'$ represents the coupled residue of an aminonaphthol sulphonic acid, a naphthol, salicylic acid or phenylenediamine.

11. Regenerated cellulose rayon material dyed by means of a dyestuff having the probable formula

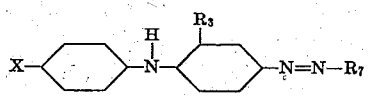

wherein $R_3$ represents hydrogen, an alkoxy or a sulphonic group and $R_7$ represents the coupled residue of a 2-amino-8-naphthol sulphonic acid, a 2-phenylamino-5-naphthol sulphonic acid or a 1-amino-8-naphthol sulphonic acid.

12. In the dyeing of regenerated cellulose rayon material blue to violet and in relatively level shades, the process which comprises applying to the said regenerated material dyes of the general formula

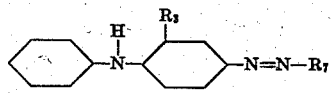

wherein $R_3$ represents hydrogen or, an alkoxy or sulphonic group, $R_7$ represents the coupled residue of an aminonaphthol sulphonic acid and X represents hydrogen or the group $-N=N-R_7'$, wherein $R_7'$ represents the coupled residue of an azo dye coupling component.

13. In the dyeing of regenerated cellulose rayon material blue to violet and in relatively level shades, the process which comprises applying to the said regenerated material dyes of the general formula

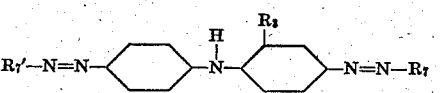

wherein $R_3$ represents hydrogen, an alkoxy or a sulphonic group, $R_7$ represents an aminonapthol sulphonic acid and $R_7'$ represents the coupled residue of an aminonaphthol sulphonic acid, a naphthol, salicylic acid or phenylenediamine.

14. In the dyeing of regenerated cellulose rayon material blue to violet and in relatively level shades, the process which comprises applying to the said regenerated material dyes of the general formula

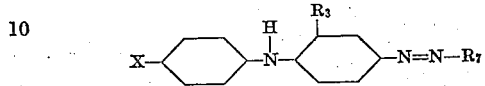

wherein $R_3$ represents hydrogen, an alkoxy or a sulphonic group, $R_7$ represents the coupled residue of a 2-amino-8-naphthol sulphonic acid, a 2-phenylamino-5-naphthol sulphonic acid or a 1-amino-8-naphthol sulphonic acid and X represents hydrogen or the group $-N=N-R_7'$, wherein $R_7'$ represents the coupled residue of an azo dye coupling component.

15. In the dyeing of regenerated cellulose rayon material blue to violet and in relatively level shades, the process which comprises applying to the said regenerated material dyes of the general formula

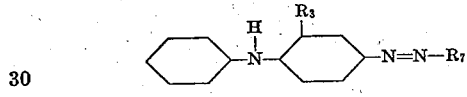

wherein $R_3$ represents hydrogen, an alkoxy or a sulphonic group and $R_7$ represents the coupled residue of a 2-amino-8-naphthol sulphonic acid, a 2-phenylamino-5-naphthol sulphonic acid or a 1-amino-8-naphthol sulphonic acid.

16. In the dyeing of regenerated cellulose rayon material blue to violet and in relatively level shades, the process which comprises applying to the said regenerated material dyes of the general formula

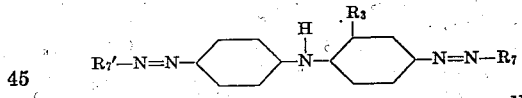

wherein $R_3$ represents hydrogen, an alkoxy or a sulphonic group, $R_7$ represents the coupled residue of a 2-amino-8-naphthol sulphonic acid, 2-phenylamino-5-naphthol sulphonic acid or a 1-amino-8-naphthol sulphonic acid, and $R_7'$ represents the coupled residue of an aminonaphthol sulphonic acid a naphthol, salicylic acid or phenylenediamine.

17. In the dyeing of regenerated cellulose rayon material blue to violet and in relatively level shades, the process which comprises applying to the said regenerated material dyes of the general formula

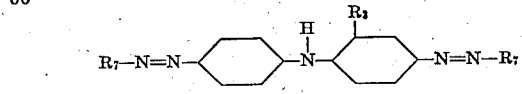

wherein $R_3$ represents hydrogen, an alkoxy or a sulphonic group and $R_7$ represents the coupled residue of a 2-amino-8-naphthol sulphonic acid, a 2-phenylamino-5-naphthol sulphonic acid or a 1-amino-8-naphthol sulphonic acid.

18. In the dyeing of regenerated cellulose rayon material blue to violet and in relatively level shades, the process which comprises applying to the said regenerated material dyes of the general formula

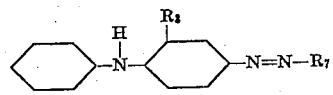

wherein $R_3$ represents hydrogen, an alkoxy or a sulphonic group and $R_7$ represents the coupled residue of an aminonaphthol sulphonic acid.

19. In the dyeing of regenerated cellulose rayon material blue to violet and in relatively level shades, the process which comprises applying to the said regenerated material dyes of the general formula

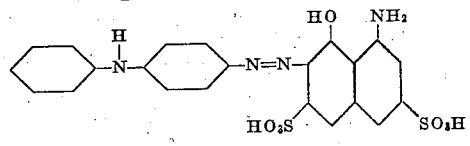

In testimony whereof I affix my signature.
RAINALD BRIGHTMAN.